July 5, 1966    O. WIEGEL    3,258,845
REFERENCE HEIGHT GAUGE
Filed May 14, 1963    2 Sheets-Sheet 1
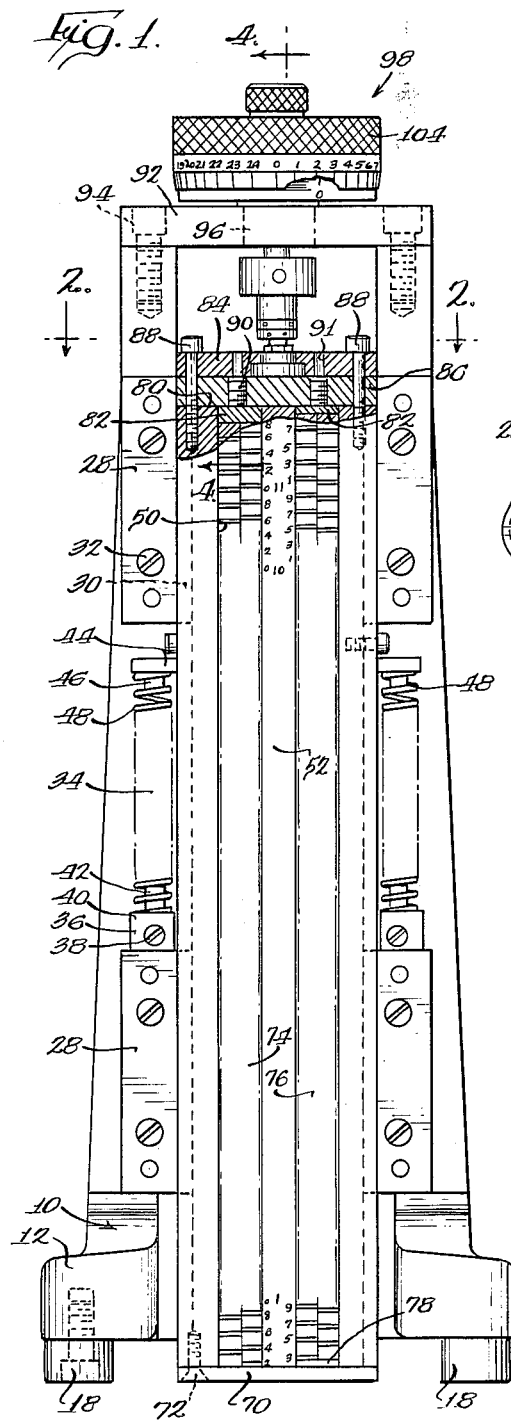
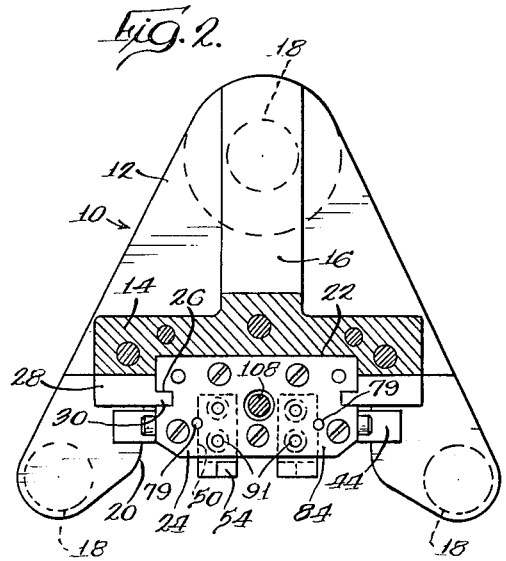
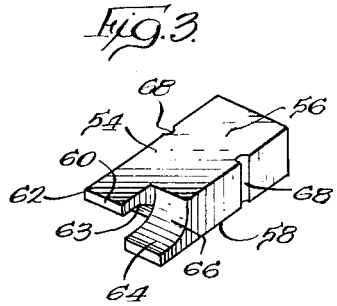
INVENTOR.
Otto Wiegel
BY
Wupper, Bradolph & Lore
Att'ys July 5, 1966      O. WIEGEL      3,258,845
REFERENCE HEIGHT GAUGE Filed May 14, 1963      2 Sheets-Sheet 2

INVENTOR.
Otto Wiegel
BY
Wupper, Gradolph & Love
Attys

United States Patent Office 3,258,845
Patented July 5, 1966

3,258,845
REFERENCE HEIGHT GAUGE
Otto Wiegel, Chicago, Ill. (% Industrial Tool Works, 3541 Martens St., Franklin Park, Ill.)
Filed May 14, 1963, Ser. No. 280,211
4 Claims. (Cl. 33—170)

My invention relates to a reference height gauge and more specifically to a gauge whereby a dial indicator, etc., may be set to a desired height and thereafter used to measure the accuracy of a surface of a workpiece.

Height gauges of the type involved here employ one or more reference surfaces which are adjusted to a particular fine adjustment by a micrometer head. In the case of plural reference surfaces, the surfaces will be spaced an accurate gross distance apart such as, for instance, one inch, and the micrometer will be capable of moving these reference surfaces a total distance equal to the spacing between the surfaces so as to obtain any desired reference measurement.

A conventional micrometer as used in a gauge of this sort requires forty full revolutions to obtain a one inch longitudinal movement. Simply to turn a micrometer this number of revolutions requires a surprising length of time, more than half a minute in the case of a careful workman. Micrometers do not spin.

My invention is directed to a reference height gauge having the successive reference surfaces substantially more closely spaced than those commonly found so as to minimize the necessary micrometer turning between successive reference heights.

One difficulty, of course, with closely spaced reference surfaces is that the surfaces must be easily accessible for the setting of a dial indicator. Another object of my invention therefore may be considered an arrangement of reference surfaces whereby consecutive surfaces may be very closely spaced without impairing their accessibility for dial indicator setting.

To measure a top surface with a dial indicator, the finger thereof must have a downward tilt. To measure an under surface, the finger must have an upward tilt. A gauge therefore should have both upwardly and downwardly facing reference surfaces. Another object of my invention resides in the provision of both upwardly and downwardly facing surfaces at each of the reference levels and in the identical members which are assembled together to provide such surfaces.

Another object of my invention lies in the members providing the reference surfaces and the way in which they may be easily machined and ground to be accurate and yet relatively inexpensive.

Still another object of my invention lies in the provision of reference surface units which are simply formed to provide both top and bottom reference surfaces and which may be stacked to provide a gauge of any desired height.

Other objects and advantages of my invention will be apparent from the following description and drawings of which:

FIG. 1 is a front elevation of a reference height gauge embodying my invention;

FIG. 2 is a section taken substantially along the line 2—2 of FIG. 1, looking in the direction of the arrows;

FIG. 3 is a perspective view of a reference surface block which may be employed in one exemplification of my invention;

FIG. 4 is an enlarged vertical section through the upper end of the reference gauge of FIG. 1 taken substantially along the line 4—4 of FIG. 1, looking in the direction of the arrows;

FIG. 5 is a perspective view of alternative form of reference surface unit;

FIG. 6 is an enlarged fragmentary central vertical section of the base of a gauge embodying my invention illustrating an alternative form of a spring counterbalance; and FIG. 7 is a bottom plan view of the modification of FIG. 6.

The illustrated gauge consist of a standard 10 including a triangular base 12 and an upright column 14, all integrally formed. A gusset 16 may be provided between the back side of the column and the base to provide a counterbalancing weight for the column and improve the stability of the gauge. Feet 18 may be secured to the corners of the base. The front side of the triangular base is indented as at 20 in order to permit the passage of movable components of my invention.

The column has a broad, flat, vertical groove 22 formed in the front face thereof. A slide 24 is mounted within the groove 22 to be movable vertically up and down. The slide extends nearly the length of the column. The slide has a pair of vertical grooves 26 in the sides thereof. An upper and a lower pair of guide plates 28 having inwardly directed ears 30 are secured to the front face of the column by screws 32 on each side of the slide with the ears directed inwardly and extending into the grooves 26 to retain the slide in the groove for vertical sliding movement.

The weight of the slide and associated structure is heavy. Therefore, to prevent excessive wear on the micrometer and associated parts and to ease the turning of the micrometer, I provide counterbalancing spring assemblies 34. Lower brackets 36 are secured by screws 38 against the front face of the column 14 on each side of the slide 24. These brackets include a forwardly extending shelf 40 having a spring retaining stud 42 extending from the top surface thereof. Similar upper brackets 44 are secured in similar fashion on each side of the slide in front of the grooves 26 above the lower brackets 36. These brackets include similar, downwardly extending spring retaining studs 46, and compression springs 48 are mounted on the studs 42 and 46. These springs may be adjusted to less-than-balance the weight of the slide or they may be adjusted to overbalance the slide and urge it upward. The former is the case in the illustrated embodiment.

The slide itself has two grooves 50 milled longitudinally in the front face thereof to leave a longitudinal central rib 52. In these grooves are mounted the interval dividers.

One form of interval divider consists of a plurality of stacked units 54 of the type illustrated in FIG. 3. These are formed from rectangular blocks having true top 56 and bottom 58 surfaces and an accurate thickness. In the illustrated embodiment the thickness is .2 inch. The left half of the front face 60 of the block is ground away on its under side to leave a forwardly projecting tongue 62 having a top surface continuous with the top surface 56 of the block and a concave recess 63 beneath. The right half of the front face 60 of the block is ground away on the top edge to leave a tongue 64 having a bottom surface continuous with the bottom surface 58 of the block and a concave recess 66 above. The thickness of the tongues is not critical. They should be thick enough for strength to avoid accidental damage and yet thin enough to provide as much clearance as possible from the surface of the block next above or next below. I find a thickness of about .06 inch entirely satisfactory. The blocks may also have semi-circular transverse grooves 68 formed in the side edges thereof for purposes to be described subsequently. The width of the block is such that it will fit comfortably and snugly within one of the grooves 50 in the slide. The length is such that the tongues 62 and 64 project beyond the front face of the slide when the blocks are contained in the grooves 50.

The blocks are assembled by laying them face to face in a stack of any desired height dependent on the length of the slide 24. The slide will accommodate two such stacks, one in each groove 50.

A backup plate 70 is secured against the bottom end of the slide as by screws 72 to close the bottom ends of the grooves 50. One of the stacks of blocks 54, here identified as stack 74, is inserted in the left hand groove 50 to rest directly on the backup plate 70. The backup plate desirably will have a thickness which is equal to or an even multiple of one of the measurement divisions. As illustrated, the plate thickness is .2 inch. The other stack 76 of blocks is inserted in the right hand groove 50 on top of a spacer 78 which in the illustrated embodiment will be .1 inch thick. Thus, the tongues in the right hand stack will be displaced above those in the left hand stack .1 inch.

To secure the stacked blocks in the grooves 50, a semicircular channel may be formed in one of the side walls of the grooves to face the grooves 68 in the blocks when the blocks are properly seated within the grooves 50. A rod 79 may then be inserted in the hole so formed.

The blocks are assembled in stacks long enough to reach nearly but not quite the top 80 of the slide. Top spacers 82 will be carried on top of the block stacks to bring them with good accuracy flush with the top of the slide.

The slide carries a collar plate 84 and a clamping plate 86 against its top end, both being secured thereto by screws 88. The clamping plate 86 secures the stack of blocks within the groove 50. This plate is bored for the reception of sunken set screws 90 over the stacks of blocks. As illustrated, there are two such screws over each of the stacks. These set screws are of the Allen head type. It will be appreciated that when accurately formed blocks are stacked together without wringing, the total height of the stack is apt to be slightly greater than the sum of the heights of the constituent blocks. This characteristic provides for a fine adjustment of the block stacks. The stacks may be assembled loosely and without wringing and installed in the groove 50. Thereafter the set screws 90 can be turned down to squeeze the stacks against the backup plate and obtain an exact distance between the several ears. The collar plate 84 has bores 91 therein in registry with the set screws 90 for such adjustment.

The column has a horizontal micrometer support 92 mounted to the top surface thereof as by screws 94. The support is a flat plate extending out to the front of the column and provide with a bore 96 therethrough within which the micrometer assembly 98 is mounted. The micrometer which I employ is entirely conventional. It consists of the usual sleeve 100 having the vertical scale thereon and a reduced neck 102 by which the micrometer is mounted in the bore 96. It also includes a rotatable thimble 104 with the circumferential scale thereon and the spindle 106. The micrometer may be either of the rotating or non-rotating spindle type. As illustrated here, the micrometer is connected to the slide by means of a threaded stud 108. The stud is threaded into one end of a collar 110 and the spindle 106 is secured in the other end of the collar by a set screw 112. Jam nuts 114 lock the stud 108 to the collar 110. At its lower end the stud is threaded into a cap 116 and the cap-stud connection locked by a jam nut 118.

The collar plate 84 has a pocket 120 formed therein which receives the cap 116, and, seated against the clamping plate, defines a cavity containing the cap within which the cap may rotate.

The operation of my device will be readily perceived from the foregoing description. To establish a reference surface at a desired height, the appropriate tongue is selected and the micrometer then moved to carry the slide no more than .1 inch or in other words no more than four full revolutions. As compared with competitive gauges requiring a maximum forty revolutions, it will be readily understood that the adjustment between settings will require materially less time. The separation of the tongues into two horizontally staggered vertical rows makes possible a greater separation between adjacent tongues (.2 inch) which contributes to greater ease of dial indicator manipulation and an easier visual differentiation between the ears. It likewise makes possible a greater thickness of the ear which will contribute to strength, proof against damage, and also greater visual distinctiveness.

The blocks provide a particularly satisfactory source of reference surfaces. Opposite faces of such blocks may be formed to the desired degree of acuracy relatively easily. The reference surfaces of the tongues are simply resiues or continuations of the original block faces. The hollowed sides of the tongues will not be used for measurement purposes. By stacking the blocks together there will be a top reference surface on the left side and a bottom reference surface on the right side for any particular tenth of an inch. It will be appreciated also that the blocks are identical regardless of their orientation and therefore no attention may be given to keeping a "top" side up in assembly. The blocks are radially symmetrical above their longitudinal axis.

In FIG. 5 I illustrate an alternative method of furnishing the reference surfaces. I provide two identical steel bars 130 only half as thick as the before-described blocks are wide so that they may be assembled side by side and inserted into the slots 50 in the same fashion as a stack of the blocks. The bars are machined along their front edge in a sort of saw-tooth configuration to provide teeth or tongues 132 having accurately formed reference surfaces 134 at right angles to the axis of the blocks and concave, cut away surfaces 136, not necessarily accurate, on the other side of the teeth. As before, the reference surfaces of the ears will be spaced apart a distance of .2 inch. The two bars will be identically formed as stated before. In the assembly into the gauge, one bar will be reversed with respect to the other and laid side by side to fill one of the grooves 50. Since the bars terminate at an even reference level, each reference level (.2, .4, .6, etc. inch) will have exactly aligned top and bottom-facing reference surfaces. A similar pair in side by side relation will be placed in the other groove 50 with, however, a spacer comparable to the spacer 78 to raise the two bars .1 inch above the backup plate 70 and thus provide, in this other groove, top and bottom reference surfaces in side by side relation in the odd .1 inch intervals between the intervals in the first described groove 50.

The division of the height of the reference gauge into many small intervals such as .1 inch as compared with the usual division into one inch intervals possesses another notable advantage other than the time saved turning the micrometer. It was pointed out above that the slide and associated parts are exceedingly heavy and that, unless some counter-balancing force is applied, the micrometer will be difficult to turn, and wear in the micrometer parts including the mechanism connecting the micrometer to the slide assembly will occur more rapidly. The slide may be underbalanced, as illustrated here, where the slide essentially hangs from the micrometer, or the slide may be somewhat overbalanced to be driven down by the micrometer but follow the micrometer upward by virtue of, for instance, a resilient return. In either case, springs will be the simplest, most compact and least expensive form of counter-balancing. Springs, however, change their resilient characteristics over the distance of their expansion or contraction. Considering the mass of the slide that must be supported, the springs must be relatively stiff, and substantial changes in their characteristics will therefore occur over a relatively short distance of travel. This can be minimized by lengthening the spring, but this imposes unsightliness, bulk and cost. Applicant contemplates that height gauges embodying the invention here described may be of any height but may extend as high as three to four feet. It will be evident that there is no necessary limit to the height.

By virtue of limiting the travel of the slide to a tenth of an inch, applicant is enabled to use the form of spring counterbalance particularly illustrated in FIGS. 6 and 7. In these figures, a leaf spring 140 bent into the form of a flat U is secured by its base 142 to the under side of the base 12 between the legs 18 thereof. As mounted, the other arm or tongue of the spring extends forwardly and is received in a notch 146 provided in the slide or in the backup plate 70. The base of the spring is wider than the tongue 144 thereof for easy insertion of the screws 148 by which the spring is secured against the base 12.

Such a spring is entirely adequate to my purposes. Since the range of movement of the slide is only a tenth of an inch, this spring will easily accommodate this range of movement and maintain a relatively constant pressure over the course of the movement. The spring is exceedingly inexpensive and unobtrusively housed, and the height of the feet 18 provides an ample range of movement. The use of this spring and all of its desirable characteristics is made possible through the maximum tenth-inch movement contemplated and made possible by applicant's division of the scale into closely spaced reference surfaces.

From the foregoing description it will be appreciated that the reference height gauge of my invention fulfills admirably its objectives as stated above. It is a gauge which requires a minimum of travel for adjustment to any desired position. It accomplishes this by a multiplication of reference surfaces. The arrangement of the reference surfaces is such that they may be easily reached and read. This characteristic is in large part due to the arrangement of the surfaces in alternate columns so that the surfaces in each column may be two units apart. I provide top and bottom reading reference surfaces at the desired intervals and provide these simply and inexpensively by a multiplication of identical parts. The parts themselves are easily formed and may be multiplied to provide a gauge of any desired height. The reduction in the required travel of the height gauge not only permits a quicker manipulation of the micrometer but also permits a cheaper, more uniform and less obtrusive counterbalancing principle.

It will also be appreciated from the foregoing description that many alternatives may exist in the practice of my invention. As one specific instance the connection of the micrometer to the slide may be varied in a great number of ways. The arrangement of parts and the various details of assembly are illustrative only and are subject to wide variation. I therefore desire that my invention be regarded as being limited only as set forth in the following claims.

I claim:
1. A reference surface scale for a reference gauge which provides both top and bottom reference surfaces at a plurality of equally spaced levels which comprises two identical bars each having a plurality of tongues projecting from one edge thereof, each of said tongues having a reference surface on the same side thereof at right angles to said edge, said bars terminating at each end on a continuation of one of said reference surfaces, said bars being situated side by side with the ends thereof aligned, the reference surfaces of one bar facing oppositely from the reference surfaces of the other bar.

2. A reference height gauge comprising a standard and a slide mounted for vertical sliding movement on said standard, said slide having a plurality of tongues providing close, equally spaced reference surfaces, a micrometer for moving said slide up and down, and a leaf spring mounted, as between said standard and said slide, to one of said members and bearing against the other of said members to counterbalance substantially the weight of said slide, said surfaces being close to minimize necessary slide travel to hold within a small range that flexure of said spring.

3. A reference height gauge comprising a standard, a slide mounted for vertical movement on said standard, said slide having tongues extending therefrom in a first and a second pair of vertical columns, the tongues in one of said columns of each pair having equally spaced horizontal top reference surfaces and the tongues in the other of said columns of each pair having equally spaced horizontal bottom reference surfaces, the reference surfaces of said one column being horizontally aligned with the reference surfaces of said other column in pairs, the planes established by the reference surfaces of said second pair of columns being midway between the planes established by the reference surfaces of said first pair of columns, and a micrometer for moving said slide up and down.

4. A reference surface scale for a reference gauge which provides both top and bottom reference surfaces at a plurality of equally closely spaced levels, which comprises two identical bars each having a plurality of tongues projecting from one edge thereof, each of said tongues having a reference surface on the same side thereof at right angles to said edge, said bars being situated side-by-side with the reference surfaces of one being aligned with the reference surfaces of the other, the reference surfaces of one bar facing oppositely from the reference surfaces of the other bar.

References Cited by the Examiner
UNITED STATES PATENTS

| | | | |
|---|---|---|---|
| 1,491,099 | 4/1924 | Hoke | 33—169 |
| 2,121,848 | 6/1938 | Winters | 33—172 |
| 2,483,743 | 10/1949 | Turrettini | 33—172 |
| 3,115,708 | 12/1963 | Roy | 33—143 |

FOREIGN PATENTS 853,684  11/1960  Great Britain.

ISAAC LISANN, *Primary Examiner.*

W. K. QUARLES, JR., *Assistant Examiner.*